United States Patent [19]

Yamada

[11] Patent Number: 4,887,082

[45] Date of Patent: Dec. 12, 1989

[54] DATA INPUT APPARATUS

[75] Inventor: Yasuaki Yamada, Matsudo, Japan

[73] Assignee: Canon Kabushiki Kaisha, Tokyo, Japan

[21] Appl. No.: 120,787

[22] Filed: Nov. 16, 1987

Related U.S. Application Data

[63] Continuation of Ser. No. 710,071, Mar. 11, 1985, abandoned.

[30] Foreign Application Priority Data

Mar. 15, 1984 [JP] Japan .................................. 59-48170

[51] Int. Cl.[4] .................................................. G06F 3/02

[52] U.S. Cl. .......................................... 341/26; 341/22

[58] Field of Search ............ 340/365 E, 365 R, 365 S, 340/365 VL; 178/17 C, 18; 400/368, 299; 235/145 R; 364/706, 709; 341/22, 23, 24, 25, 26

[56] References Cited

U.S. PATENT DOCUMENTS

| | | | |
|---|---|---|---|
| 3,781,874 | 12/1973 | Jennings | 340/365 S |
| 4,024,534 | 5/1977 | Duvall | 340/365 E |
| 4,106,011 | 8/1978 | Melanson et al. | 340/365 E |
| 4,408,191 | 10/1983 | Fowler, III | 340/365 R |
| 4,490,055 | 12/1984 | Johnson et al. | 340/365 E |
| 4,502,039 | 2/1985 | Vergesi et al. | 340/365 S |
| 4,517,553 | 5/1985 | Engstrom | 340/365 E |
| 4,609,908 | 9/1986 | Amano | 340/365 S |

*Primary Examiner*—David K. Moore
*Assistant Examiner*—M. Fatahiyar
*Attorney, Agent, or Firm*—Fitzpatrick, Cella, Harper & Scinto

[57] ABSTRACT

A data input apparatus comprising a plurality of input keys. A determiner determines whether the time required for executing the function of a pressed key is long or short. In response to the results of determination of the determiner, a first timekeeping device produces a first predetermined time signal, and a second timekeeping device produces a second time signal shorter in duration than the predetermined time signal. A CPU receives data representative of the pressed key at the end of the first or second time signal. In response to receipt of the data by the CPU, a third timekeeping device produces a third time signal shorter in duration than the second time signal. At the end of this third time signal, the CPU receives the data for as long as the key continues to be pressed. The third timekeeping device may include two different timekeeping elements which produce different time signals in order to be used in conjunction with the first and second timekeeping devices, respectively. Alternatively, a computer may perform the same function as mentioned above, using software techniques.

16 Claims, 4 Drawing Sheets

DATA INPUT APPARATUS

This application is a continuation of application Ser. No. 710,071, filed Mar. 11, 1985, now abandoned.

BACKGROUND OF THE INVENTION

1. Field of the Invention

The present invention relates to electronic apparatus which include a keyboard such as personal computers, word processors, electronic typewriters or the like.

2. Description of the Prior Art

Conventionally, electric typewriters are constructed such that a two-stage control mechanism is provided for a space bar, a carriage return key, character keys or the like. When a key is pressed in a normal manner, operation is executed only once, and when the key is pressed further or more firmly, repeat operatio is executed.

More recently, these switches which include a double contact are constructed so as to execute repeat operation when they are pressed more firmly. In addition, at present, various electronic apparatus are well known which are constructed such that repeat operation is executed by continuous pressing of a key.

The above-mentioned switches which have a double contact are expensive and difficult to miniaturize structurally. Thus, inexpensive personal typewriters or the like are equipped with a keyboard which executes repeat operation by continuous pressing. In this case, generally, the automatic repeat function is executed after about 0.5 seconds from initial pressing of a particular key. That is, the time required for starting the repeat operation after the particular key has been pressed is constant. As described above, since the waiting time taken until start of the repeat operation is constant irrespective of the kinds of function to be repeated, users sometimes experience an inconvenience. In other words, if a sufficient time difference is sset so as to suit the time when the repeat operation of functions like carriage return, line feed, etc., starts; the operator may be inconvenienced when high-speed repeat operation of, for example, the space key or the like is to be performed. On the other hand, if the waiting time taken until repeat operation starats is set to a short value, excess repeat operation may be executed improperly.

SUMMARY OF THE INVENTION

In view of the above, it is an object of the present invention to provide an electronic apparatus which varies the time period before which repeat operation starts in accordance with the function of the pressed or actuated key and is thereby convenient to use.

In order to attain such object, according to the present invention, an electronic apparatus with a keyboard includes determination means for determining the kind of a pressed key and control means for setting the timing of starting the repeat operation in accordance with the results of determination by the determination means.

It is another object of the present invention to provide a key input apparatus which is capable of taking in key data a predetermined time after the key data have been input.

It is still another object of the presen invention to provide a data input apparatus which is capable of taking in certain data a predetermined time after the data has been input.

DETAILED DESCRIPTION OF THE PREFERRED EMBODIMENTS

Now, the present invention will be described in more detail with respect to the drawings.

Figure 1:
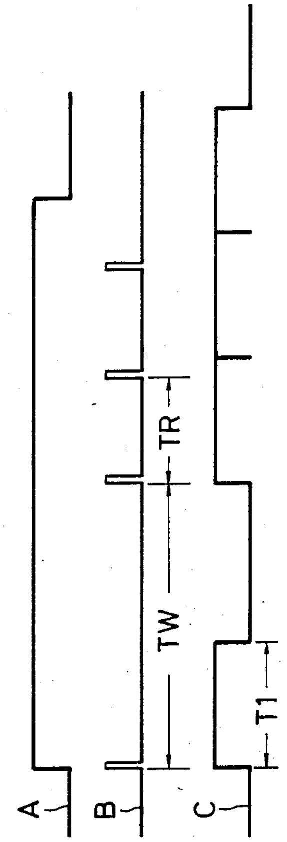
FIG. 1 PRIOR ART
FIGS. 1 and 2 are timing charts showing prior art techniques.

FIG. 1 is a chart illustrating the repeat operation related to a prior art technique. In the figure, a signal A denotes a key signal, the high level of which indicates the time during which the key is pressed. A signal B denotes a signal which represents the timing of reading key signal. Reference character TW denotes a waiting time for starting the repeat operation. Reference character TR denotes the repeat interval. A signal C illustrates the state in which the repeat function is executed. Reference character T1 represents the time required for executing the function of the pressed key.

Thus, in fact, TW-T1 is the waiting time for the operator. If the time is long, the operator may feel uncomfortable as explained above.

Figure 2:
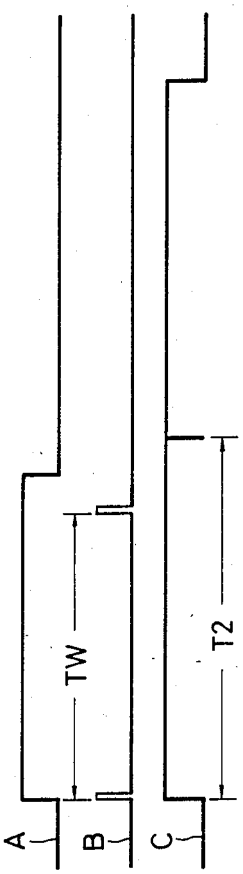
FIG. 2 PRIOR ART

FIG. 2 is also a chart showing the repeat operation of another prior art technique. In the figure, the execution time T2 is longer than T1. That is, in the sequence shown in this figure, TW <T2 owing to slow operation. Thus, owing to slow operation, the operator tends to press the key too long, so that although the operator expects only one operation, he will command repeat operation, that is operation will be repeated twice.

Figure 3A:
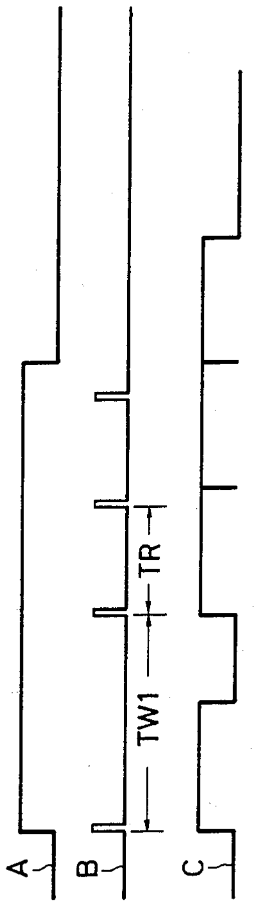
FIGS. 3A and 3B are timing charts illustrating the principle of the present invention.
Figure 3B:
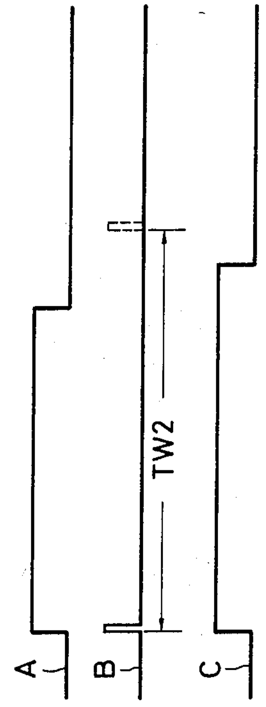

FIGS. 3A and 3B illustrate the sequence of operations according to the present invention. FIG. 3A denotes a case where a short time is required for execution of the function of a pressed key, and FIG. 3B a case where a longer time is required for execution of the function of a pressed key. The signals A, B and C are as shown in FIGS. 1 and 2.

In the present invention, when the execution time is short (i.e., execution of the function of a pressed key is completed in a short time), the repeat waiting time TW1 is set to a value shorter than TW (see the prior art technique of FIG. 1) as kown in FIG. 3A. On the contrary, when slow operation is executed, the repeat waiting time TW2 is set to a value longer than TW (see FIG. 1), as shown in FIG. 3B. Thus, even if a long time is required for execution of the function of a pressed key, unnecessary repeat operation can be avoided.

Figure 4:
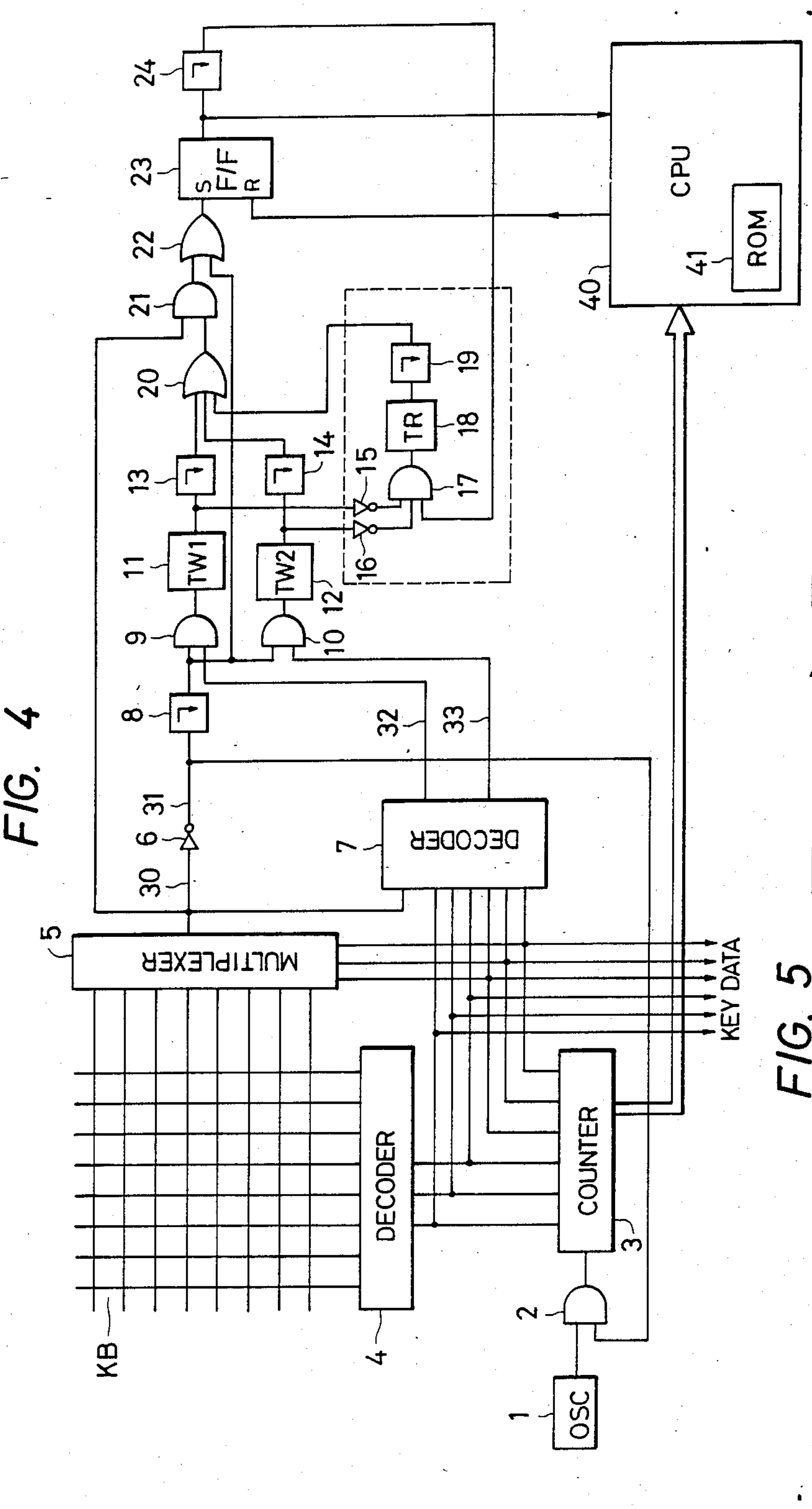
FIG. 4 is a block diagram showing one embodiment of the present invention.

FIG. 4 illustrates one embodiment of a key control unit according to the present invention.

In the figure, reference character KB denotes a keyboard including a plurality of keys (not shown); reference numeral 1 denotes an oscillator; reference numeral 2 an AND gate; reference numeral 3 a counter; reference numeral 4 a decoder; and reference numeral 5 a multiplexer. This arrangement makes use of a prior art dynamic key scan system. The oscillator 1 generates pulses which drive the counter 3 to count the pulses. The output of the counter 3 is delivered to the decoder 4 and the multiplexer 5, thereby causing a key matrix to be scanned sequentially.

When any one of the keys is pressed and a corresponding switch is closed, the multiplexer 5 generates a signal 30 which closes the AND gate 2 via an inverter 6, thereby stopping the counting operation of the counter 3. The count value of the counter 3 represents a key code which indicates the position of a closed key by the corresponding column and row of the matrix, thereby allowing the kind or function of the pressed key to be determined.

Figure 5:
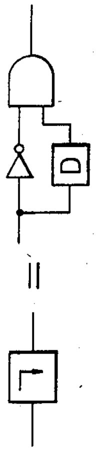
FIG. 5 illustrates an equivalent circuit of an edge detector.

Reference numerals 8, 13, 14, 19 and 24 denote an edge detector composed of an inverter, a delay element, and an AND gate, as shown in FIG. 5. The detector detects changes in the input signal from "1" to "0" and produces a pulse. Reference numerals 9, 10, 17 and 21 denote AND gate; reference numerals 20 and 22 denote OR gates; and reference numerals 11, 12 and 18 denote one-shot multivibrators which produce time durations TW1, TW2 and TR. Reference numeral 23 denotes a set/reset type flip-flop.

Reference numeral 7 denotes a decoder which produces one of signals 32 and 33 when a key is pressed, in response to a signal 30 and when the decoder determines that the contents of the ocunter 3 (key code) designate the repeat operation. When the key code correponds to rapid operation (FIG. 3A), the signal 32 changes to "1", and a signal 31, which is the inverse of the key detection signal 30, is introduced into the edge detector 8. The resulting pulse triggers the one-shot multivibrator 11. This pulse also sets a flip-flop 23 via the OR gate 22.

The flip-flop 23 produces an interrupt request signal to a CPU 40. Reading of the counter 3 contents by the CPU resets the flip-flop 23. A change in the output signal from the fli-flop 23 is transformed into a pulse by an edge detector 24. Since the one-shot multivibrator 11 has been triggered, however, the AND gate 17 is already closed by the action of the inverter 15. Thus, the one-shot multivibrator 18 is not triggered.

When the output of the one-shot multivibrator 11 change from "1" to "0" after the time TW1 has elapsed, the edge detector 13 outputs a pulse, at which time if the key continues to be pressed, the AND gate 21 is opened. Thus, the flip-flop 23 is set and delivers an interrupt request signal to the CPU 40, and thus automatic repeat operation is executed.

When the contents of the counter 3 (the same contents as read previously) are read by the CPU 40, the flip-flop 23 is reset, thereby causing the edge detector 24 to produce a pulse. At this ime, the outputs of the one-shot multivibrators 11 and 12 are together "0", so that the AND gate 17 is opened. Thus, the pulse from the edge detector 24 triggers the one-shot multivibrator 18. The output of the multi-vibrator 18 then changes to "0" when the time TR elapses, thereby causing the edge detector 19 to produce a pulse. This pulse sets the flip-flop 23, thereby delivering an interrupt request to the CPU 40. Thereafter until the key is released, an interrupt request is produced at intervals of TR and automatic repeat operation is executed.

When the key input represents slow operation (see FIG. 3B), the decoder 7 delivers a signal 33 which triggers the one-shot multivibrator 12, thereby executing automatic repeat operation after the TW2 waiting time.

Figure 6:
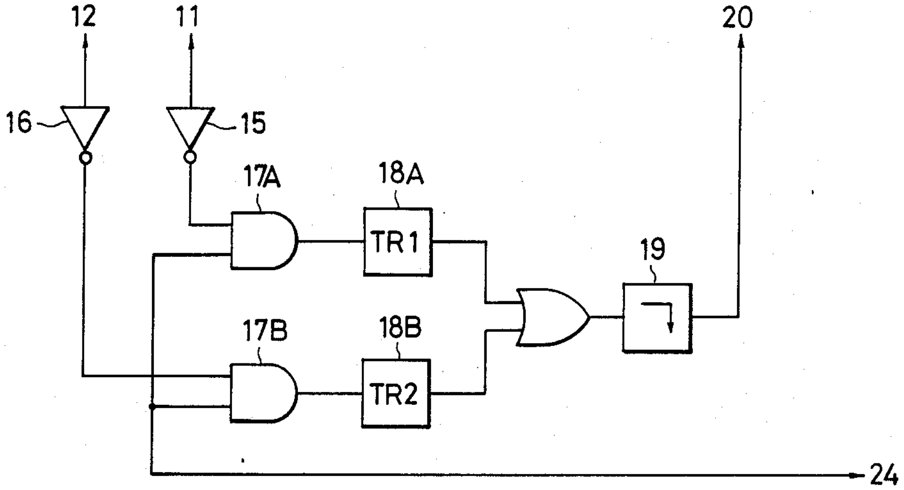
FIG. 6 illustrates another embodiment of part of the block diagram of FIG. 4.

The portion of the block diagram of FIG. 4, enclosed by the broken lines, may be constituted, as shown in FIG. 6.

That is, in order that the one-shot multivibraor 18, which determines the period during which the key data is received after the repeat operation has started, may have periods corresponding to the rates of processing the key data, two elements TR1 and TR2 may be provided.

The above description is directed o he structure of FIG. 6, constituted by hardware, but alternatively a program stored in a ROM 41 of the CPU 40 may provide similar effects.

As described above, according to the present invention, when rapid operation is executed (for example, when the space key or the like is executed), repeat operation is executed without causing he user to wait so long as to feel uncomfortable. On the other hand, when slow operation is executed (for example, when carriage return or the like is executed), unnecessary repeat operation can be prevented.

I claim:

1. A key input apparatus comprising:
- key input means including a plurality of keys;
- key data producing means for producing key data each associated with one of said keys, each said key datum being produced by said key data producing means in response to the operation of said associated key, each said key datum being capable of performing a repeated operation;
- identification means for identifying an operated key in said key input means; and
- control means, in response to the identifying of an operated key by said identification means, for varying the repeat waiting time for starting the repeated operataion.

2. A key input apparatus according to claim 1, wherein said key input means comprises a matrix.

3. A key input apparatus comprising:
- a plurality of keys each capable of performing a corresponding repeat operation of the corresponding key by continuous depression thereof;
- determining means for determining whether the time required for the repeat operation of said apparatus corresponding to a depressed key is long or short; and
- control means for varying the repeat waiting time for starting the repeat operation according to the length of an operation time period corresponding to the depressed key.

4. A key input apparatus according to claim 3, wherein said keys are arranged as a maatrix.

5. A key input apparatus according to claim 3, wherein said control means includes plurality of one-shot multivibrators.

6. A key input apparatus comprising:
- key input means comprising a plurality of keys, adapted to perform either a quick repeat operation or a slow repeat operation;
- identification means for identifying whether an operated key is adapted to perform a quick repeat operation or a slow repeat operation; and
- control means for varying the repeat waiting time for starting the repeat operation of an operated key in response to the identifying by said identification means.

7. A key input apparatus according to claim 6, wherein said keys are arranged in a matrix.

8. A key input apparatus according o claim 6, wherein said plurality of keys include a space key and a carriage return key, wherein said space key performs a quick repeat operation and said carriage return key performs a slow repeat operation.

9. A key input apparatus according to claim 6, further comprising:

means for generating a signal for executing repeat operation of said apparatus for a predetermined period upon start of the repeat operation after the period of time set by said control means.

10. A key input apparatus comprising:

key input means comprising a plurality of keys associated with a short time repeat operation and a plurality of keys associated with a long time repeat operation, a repeat operation being performed by the continuous depression of at least one of said plurality of keys;

identification means for identifying whether a depressed key is associated with the repeat operation and for identifying whether said depressed key is a long time repeat operation key or a short time repeat operation key; and control means for varying a repeat waiting time for starting the repeat operation associated with said depressed key, in response to the identifying by said identifying means.

11. A key input apparatus according to claim 10, wherein said key input means has a matrix configuration.

12. A key input apparatus according to claim 10, wherein said plurality of keys associated with the short time repeat operation comprise a space key, wherein said plurality of keys associated with the long time repeat operation comprise a carriage return key.

13. A key input apparatus comprising:

key input means including a plurality of keys for respectively executing a plurality of functions, wherein at least one of said plurality of keys executes a repeat operation;

function identification means for identifying the function of an operated key;

repeat identification means for identifying whether the "function identified by the function identification means of the" operated key is a repeat operation; and control means for varying a repeat waiting time for starting the repeat operation according to the identifying of the function of an operated key by said function identification means when said repeat identification means identifies that the operated key executes the repeat operation.

14. A key input apparatus according to claim 13, wherein said key input means has a matrix configuration.

15. A key input apparatus according to claim 13, wherein said key input means inputs a key code signal into said apparatus and said function identification means identifies the function of an operated key by referring to the input key code signal.

16. A key input apparatus according to claim 13, wherein said key input means inputs a key code signal into said apparatus and said repeat identification means identifies whether the operated key executes the repeat operation by referring to the input key code signal.

* * * * *

UNITED STATES PATENT AND TRADEMARK OFFICE

CERTIFICATE OF CORRECTION

PATENT NO. : 4,887,082 Page 1 of 3

DATED : December 12, 1989

INVENTOR(S) : Yasuaki Yamada

It is certified that error appears in the above-identified patent and that said Letters Patent is hereby corrected as shown below:

Title page:

[56] References Cited:

Line 2, "Duvall" should read -- Du Vall--, and "Vergisi et al." should read --Vercesi et al--.

COLUMN 1:

Line 18, "operatio" should read --operation--.

Line 39, "sset" should read --set--.

Line 45, "starats" should read --starts--.

Line 65, "presen" should read --present--.

COLUMN 2:

Line 52, "kown" should read --shown--.

COLUMN 3:

Line 17, "AND gate;" should read --AND gates;--.

Line 25, "ocunter 3" should read --counter 3--.

Line 37, "fli-flop 23" should read --flip-flop 23--.

Line 43, "change" should read --changes--.

UNITED STATES PATENT AND TRADEMARK OFFICE
CERTIFICATE OF CORRECTION

PATENT NO. : 4,887,082 Page 2 of 3

DATED : December 12, 1989

INVENTOR(S) : Yasuaki Yamada

It is certified that error appears in the above-identified patent and that said Letters Patent is hereby corrected as shown below:

COLUMN 4:

Line 4, "one-shot multivibraor 18," should read --one-shot multivibrator 18,--.

Line 10, "o he" should read --to the--.

Line 17, "he" should read --the--.

Line 36, "operataion." should read --operation.--.

Line 52, "maatrix." should read --matrix.--.

Line 54, "plurality" should read --a plurality--.

COLUMN 5:

Line 1, "o" should read --to--.

Line 27, "identifying means." should read --identification means.--.

Line 33, "key, wherein" should read --key, and wherein--.

UNITED STATES PATENT AND TRADEMARK OFFICE

CERTIFICATE OF CORRECTION

PATENT NO. : 4,887,082  Page 3 of 3

DATED : December 12, 1989

INVENTOR(S) : Yasuaki Yamada

It is certified that error appears in the above-identified patent and that said Letters Patent is hereby corrected as shown below:

COLUMN 6:

Line 11, ""function" should read --function--.

Line 12, "the"" should read --the--.

Signed and Sealed this

Seventh Day of July, 1992

Attest:

DOUGLAS B. COMER

*Attesting Officer*

*Acting Commissioner of Patents and Trademarks*